(12) United States Patent
Lewis-Aburn et al.

(10) Patent No.: US 7,033,533 B2
(45) Date of Patent: Apr. 25, 2006

(54) METHOD OF MANUFACTURING A MOULDED ARTICLE AND A PRODUCT OF THE METHOD

(76) Inventors: Matthew James Lewis-Aburn, 59 Mill Rise, Robertsbridge, East Sussex, TB32 5EG (GB); Michelle Anita Lewis-Aburn, 59 Mill Rise, Robertsbridge, East Sussex, TB32 5EG (GB)

( * ) Notice: Subject to any disclaimer, the term of this patent is extended or adjusted under 35 U.S.C. 154(b) by 684 days.

(21) Appl. No.: 09/843,288

(22) Filed: Apr. 25, 2001

(65) Prior Publication Data

US 2001/0054241 A1 Dec. 27, 2001

(51) Int. Cl.
*B29C 45/14* (2006.01)
*B29C 70/70* (2006.01)

(52) U.S. Cl. ............ 264/275; 264/259; 264/271.1; 441/64

(58) Field of Classification Search ........ D21/806; 441/61, 64; 264/241, 244, 245, 246, 247, 264/259, 271.1, 275, 278, 279, 279.1
See application file for complete search history.

(56) References Cited

U.S. PATENT DOCUMENTS

| | | | | |
|---|---|---|---|---|
| 4,347,270 A | * | 8/1982 | Hart | 428/13 |
| 4,386,123 A | * | 5/1983 | Coburn, Jr. | 428/29 |
| 4,561,140 A | * | 12/1985 | Graham et al. | 12/146 BR |
| 5,163,859 A | * | 11/1992 | Beltrani et al. | 441/64 |
| 5,304,081 A | * | 4/1994 | Takizawa | 441/64 |
| 5,358,439 A | * | 10/1994 | Paolo | 441/64 |
| 5,435,764 A | * | 7/1995 | Testa et al. | 441/64 |
| 5,542,865 A | * | 8/1996 | Alvarez De Toledo | 441/64 |
| 5,580,507 A | * | 12/1996 | Williamson et al. | 264/221 |
| D382,322 S | * | 8/1997 | Cressi | D21/806 |
| 5,814,252 A | | 9/1998 | Gouldson et al. | |
| 5,814,254 A | * | 9/1998 | Bisconti | 264/46.4 |
| 5,820,719 A | * | 10/1998 | Strickland et al. | 156/245 |
| 6,217,806 B1 | * | 4/2001 | Baxley | 264/161 |
| 6,264,869 B1 | * | 7/2001 | Notarpietro et al. | 264/247 |

FOREIGN PATENT DOCUMENTS

| | | |
|---|---|---|
| EP | 0130424 A1 | 6/1984 |
| EP | 0640361 A1 | 7/1994 |
| GB | 984250 | 2/1965 |
| JP | 4197301 A | 7/1992 |

* cited by examiner

*Primary Examiner*—Angela Ortiz
(74) *Attorney, Agent, or Firm*—Davis & Bujold PLLC

(57) ABSTRACT

A method of manufacturing a molded product comprising the steps of: providing a mold conforming to the shape of the product the mold serving to define one or more molding surfaces which are to be reproduced in an article formed via the mold; mounting in the mold an article including or forming an image comprising at least one device, logo, letter, word or words or combinations of these in such a way that most, if not all of the article lies within the mold out of contact with the or each molding surface; and injecting into the mold a supply of polymerisible material so as to immerse the article; the material, at least following polymerisation being flexible and so providing at least in part, a substantially transparent product; and withdrawing the product from the mold. Typically the step of providing product is directed to an article of footwear such as a shoe or swimming fin (also known as a flipper). The invention provides for a single stage product or the step of providing the mold conforming to the shape of the product serves also to juxtapose a previously formed or molded product for attachment to a product formed in the injection step. The invention extends to a molded product which is of flexible plastics material molded by way of the method.

6 Claims, 2 Drawing Sheets

METHOD OF MANUFACTURING A MOULDED ARTICLE AND A PRODUCT OF THE METHOD

FIELD OF THE INVENTION

This invention relates to a method of manufacturing a moulded article and a product of the method. It is particularly though not exclusively concerned with moulding of footwear including swimming fins.

BACKGROUND OF THE INVENTION

In the manufacture of moulded articles of plastics materials it is known to line the mould with a coating of gel material prior to the injection of the bulk of the plastics material. In this way it is possible to achieve a smooth external surface on the moulded product. The surface of the resulting product if subject to abrasion tends to scuff with a consequent deterioration in appearance. In particular footwear can be readily scuffed on a variety of surfaces and any surface decoration is liable to damage particularly if worn in a waterside or seaside environment.

SUMMARY OF THE INVENTION

According to a first aspect of the present invention there is provided method of manufacturing a moulded product comprising the steps of:

providing a mould conforming to the shape of the product the mould serving to define one or more moulding surfaces which are to be reproduced in an article formed by means of the mould;

mounting in the mould an article including or forming an image comprising at least one device, logo, letter, word or words or combinations of these in such a way that most, if not all of the article lies within the mould out of contact with the or each moulding surface; and injecting into the mould a supply of polymerisible material so as to immerse the article; the material, at least following polymerisation being flexible and so providing at least in part, a substantially transparent product; and withdrawing the product from the mould.

According to a first preferred version of the first aspect of the present invention the step of providing product is an article of footwear such as a shoe or swimming fin (also known as a flipper).

According to a second preferred version of the first aspect of the present invention. Or of the first preferred version thereof the step of providing the mould conforming to the shape of the product serves also to juxtapose a previously formed or moulded product for attachment to a product formed in the injection step.

According to a second aspect of the present invention there is provided a moulded product which is of flexible plastics material moulded by the method of the first aspect or any preferred version thereof.

BRIEF DESCRIPTION OF THE DRAWINGS

An exemplary embodiment of the invention will now be described with reference to the accompanying drawings of steps of a method of moulding a swimming fin of which

DETAILED DESCRIPTION OF THE INVENTION

FIG. 1

An open mould 11 has internal moulding surface 12, 13 conforming to the surfaces of a swimming fin to be manufactured by means of the mould. The mould 11 includes locating jaws A1, A2 and B1, B2 whose function is described hereafter.

FIG. 2

Prior to the moulding of product the moulding surfaces 12, 13 are cleaned and coated with a release agent. An article 14 is mounted by means of lower jaws A1, B1 so as to lie within the mould 11 but clear of the moulding surfaces 12, 13. The article 14 comprises a clear acrylic strip 14A on which an image or series of images is placed whether by printing or otherwise and whether flat, embossed or recessed on the strip 14A. In this case the image is made up of a sequence of the letter 'FF' but any type of image can be utilised including a device, logo, letter, word or words or combinations of these or patterns or bands or whatever. In this case the strip 14A is a clear strip of uniform width. In alternative versions it can be made single or multi coloured. The article 14 rather than being a flat strip can be curved More than one article corresponding to article 14 can be used so that in a finished moulded article a variety of images are visible within the moulded article lying at different depths from an outside surface of the article.

FIG. 3

Figure 1:
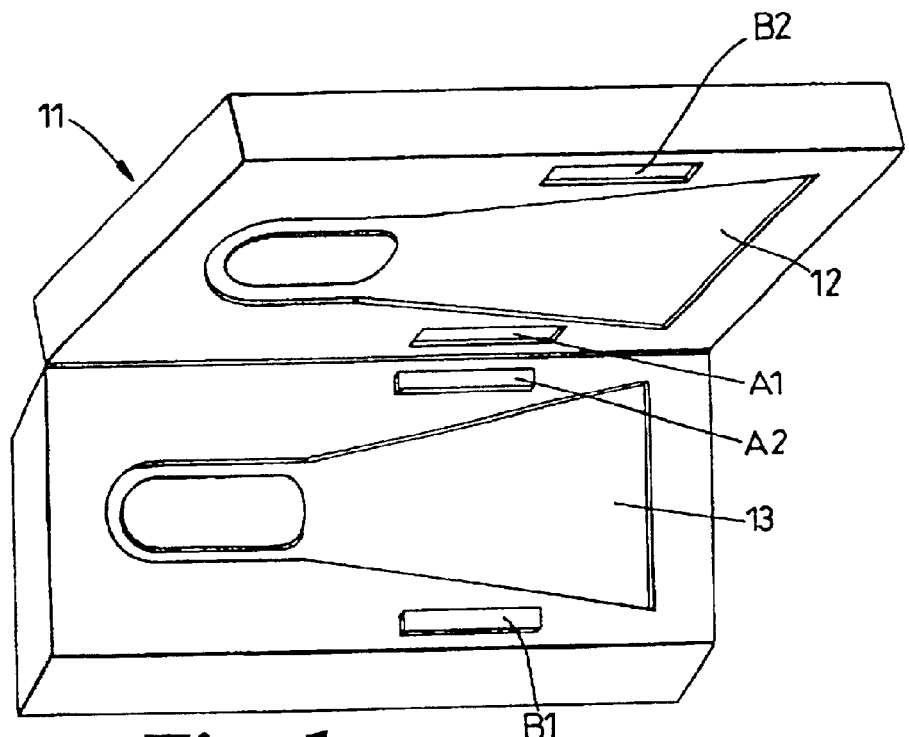
FIG. 1 shows a side view of a mould in an open configuration.
Figure 2:
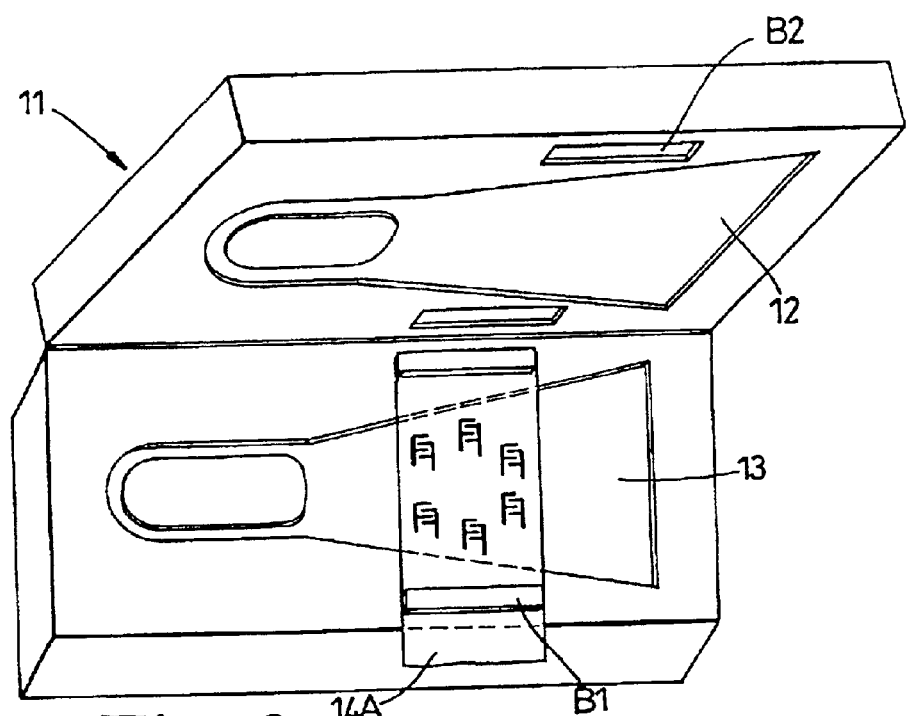
FIG. 2 shows the mould of FIG. 1 with the addition of an article.
Figure 3:
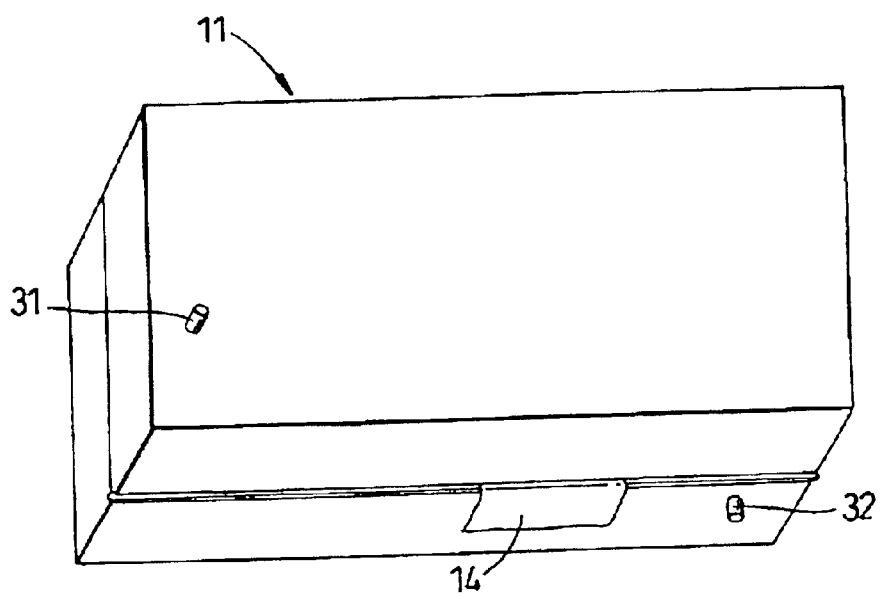
FIG. 3 shows the mould of FIG. 2 in a closed configuration.
Figure 4:
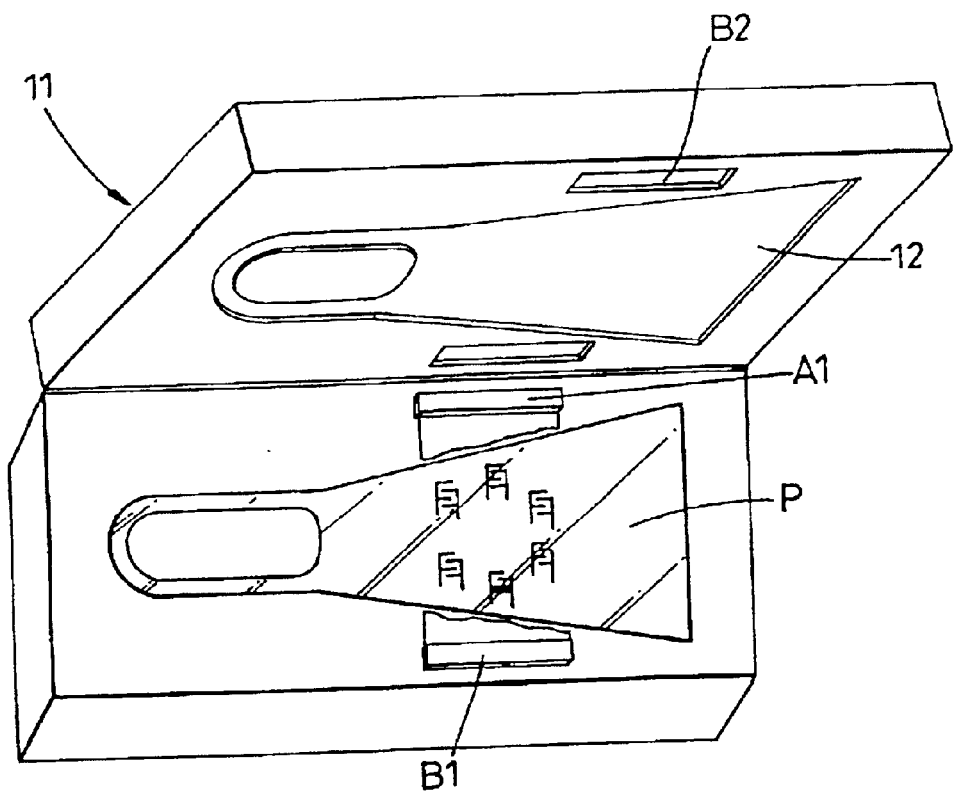
FIG. 4 shows the mould of FIG. 3 opened following a mould injection step.

This shows the mould of FIG. 2 now closed resulting in the article 14 being clamped at one end between upper jaw A2 and lower jaw A1 and at the other end to the one end between upper jaw B12 and lower jaw B1. Prepared liquid plastic material including accelerator and catalyst are then injected by way of sprue 31 into the mould from a filling machine. Once injected material is seen venting from outlet 32 the injection process is stopped and polymerisation allowed to occur.

FIG. 4

Once polymerisation of the moulded article is completed the mould 11 is opened to reveal the completed product P which being of transparent plastic reveals the images on article 14. The strip 14A being mainly transparent and embedded in the clear plastics material of the article 14 is now not visible and only the image is seen.

The product P is removed from the mould 11 which is then prepared for a further injection step.

The above exemplary embodiment describes the production of an independent article. However the further invention further embraces the use of the described process by juxtaposing a modified version of mould 11 to enable it to locate a previously formed component, such as a shoe or sandal so that the step of forming the product P the product P is attached to the juxtaposed shoe or sandal.

In addition the article 14 is shown clamped in place by jaws A1, A2 and B1, B2. In this case this serves to resist any displacement of the article 14 arising during the injection stage. Where support at either end of a strip is not sufficient of itself then the article bearing the image which is to be embedded in the product then in addition to the jaws or as a replacement for them other locating means can be used to provide for the correct alignment of the images to be displayed through the body of the product. If necessary the locating means can themselves be of transparent material so as to be rendered invisible in the finished product.

While the exemplary embodiment refers to an article 14 of limited width it is envisaged that the article could be comparable in extent to the overall size of the moulded article in which it is embedded following moulding so that any image carried on the article is visible over the major part of the product and from any direction. Thus the article can be any size from the relatively small proportion of the whole product as shown in the drawings up to a filling the product.

What is claimed is:

1. A method of manufacturing a molded product in the form of a swimming fin comprising the steps of:
   providing a mold conforming to the shape of the swimming fin, the mold serving to define one or more molding surfaces which are to be reproduced in a fin formed by means of the mold;
   mounting in the mold an article comprising a clear strip incorporating at least one of a device, a logo, a letter, a word or a combination thereof in such a way that the at least one device, logo, letter, word or combination thereof lies within the mold out of contact with the or each molding surface;
   injecting into the mold a supply of polymerizable material so as to immerse the article; and the polymerizable material, at least following polymerization, being flexible and transparent so providing, at least in part, a substantially transparent product; and
   withdrawing the product from the mold following polymerization.

2. The method according to claim 1, further comprising the steps of coating the one or more molding surfaces which are to be reproduced in a fin formed by means of the mold with a release agent; and
   mounting the article between a pair of jaws support by the mold.

3. A molded swimming fin molded from a flexible and transparent plastics material by a method comprising the steps of:
   providing a mold conforming to the shape of the swimming fin, the mold serving to define one or more molding surfaces which are to be reproduced in an fin formed by the mold;
   mounting in the mold an article comprising a clear strip incorporating at least one device, logo, letter, word or combination thereof in such a way that the at least one device, logo, letter, word or combination thereof lies within the mold out of contact with the or each molding surface;
   injecting into the mold a supply of polymerizable material so as to immerse the article; and the polymerizable material, at least following polymerization, being flexible and transparent so providing, at least in part, a substantially transparent product; and
   withdrawing the product from the mold following polymerization.

4. The molded swimming fin according to claim 3, wherein the one or more molding surfaces which are to be reproduced in a fin formed by means of the mold are coated with a release agent; and
   the article is mounted between a pair of jaws support by the mold.

5. A method of manufacturing a swimming fin, the method comprising the steps of:
   providing a pair of molds conforming to the shape of the swimming fin to be molded with the pair of molds each defining at least one molding surface for being reproduced in a swimming fin formed by the pair of molds, and at least one of the pair of molds having a pair of opposed alignment jaws;
   providing a clear acrylic strip article with at least one of a device, a logo, a letter, or combination thereof;
   mounting the clear acrylic strip article such that the at least the device, logo, letter, word or combination thereof lies substantially within a plane defined by the pair of molds with an intermediate portion of the clear acrylic strip article suspended between the pair of opposed alignment jaws out of contact with the at least one molding surface of each of the pair of molds and the clear acrylic strip article lying within the plane defined by the pair of molds;
   selecting a polymerizable material which, following polymerization, remains flexible and transparent so to provide, at least in part, a substantially transparent molded swimming fin;
   injecting a supply of the polymerizable material into the mold and allowing the polymerizable material to surround the clear acrylic strip article and polymerize; and
   withdrawing the swimming fin from the mold following polymerization with the integrally molded within the swimming fin.

6. The method according to claim 5, further comprising the steps of coating each of the at least one molding surface which is to be reproduced in a swimming fin formed by the mold with a release agent; and
   mounting the article between the pair of opposed alignment jaws of the mold.

* * * * *